US010549584B2

(12) United States Patent
Sakakibara

(10) Patent No.: US 10,549,584 B2
(45) Date of Patent: Feb. 4, 2020

(54) PNEUMATIC TIRE AND METHOD OF MANUFACTURING PNEUMATIC TIRE

(71) Applicant: TOYO TIRE & RUBBER CO., LTD., Osaka-shi, Osaka (JP)

(72) Inventor: Kazuhiro Sakakibara, Osaka (JP)

(73) Assignee: Toyo Tire Corporation, Itami-shi (JP)

(*) Notice: Subject to any disclaimer, the term of this patent is extended or adjusted under 35 U.S.C. 154(b) by 373 days.

(21) Appl. No.: 15/499,098

(22) Filed: Apr. 27, 2017

(65) Prior Publication Data

US 2017/0326924 A1    Nov. 16, 2017

(30) Foreign Application Priority Data

May 13, 2016  (JP) ................................ 2016-096916

(51) Int. Cl.
*B60C 19/00* (2006.01)
*B29D 30/00* (2006.01)

(52) U.S. Cl.
CPC ........ *B60C 19/002* (2013.01); *B29D 30/0061* (2013.01); *B29D 2030/0072* (2013.01)

(58) Field of Classification Search
CPC ..... B60C 19/00; B60C 19/002; B60C 19/003; B60C 19/12; B60C 19/122; B60C 19/125; B60C 19/127; B60C 5/002
See application file for complete search history.

(56) References Cited

U.S. PATENT DOCUMENTS

2009/0038726 A1    2/2009   Yukawa

FOREIGN PATENT DOCUMENTS

| GB | 2483255 | * | 3/2012 |
| JP | 5-294102 A | | 11/1993 |
| JP | 7-117404 A | | 5/1995 |
| JP | 2006-306302 A | | 11/2006 |

* cited by examiner

*Primary Examiner* — Justin R Fischer
(74) *Attorney, Agent, or Firm* — Westerman, Hattori, Daniels & Adrian, LLP

(57) ABSTRACT

A pneumatic tire includes a plate-like member in which a plurality of through holes and slits having both ends positioned within a plate surface are formed, and a supporting member which is inserted into the slits and supports plate-like portions in both sides of the slits in opposite directions to each other, wherein the plate-like member is attached to an inner surface of the tread portion by mounting portions which are respectively positioned closer to an outer side than both ends of the slits, so that a space is formed between the plate-like member and the inner surface of the tread portion.

6 Claims, 9 Drawing Sheets

PNEUMATIC TIRE AND METHOD OF MANUFACTURING PNEUMATIC TIRE

BACKGROUND OF THE INVENTION

Field of the Invention

The present invention relates to a pneumatic tire which can reduce a cavity resonance noise by attaching a plate-like member to an inner surface of a tread portion, and a method of manufacturing the pneumatic tire.

Description of the Related Art

When the vehicle travels on a rough road surface or climbs over a joint of the road surface, a sound called as a road noise may be generated within the vehicle. The road noise is one of the sound with which a tire is involved. In the case that the tire is vibrated by an input caused by irregularity on the road surface, a cavity resonance noise is excited in an internal portion of the tire by the oscillation, and the sound is caused within the vehicle.

Patent document 1 describes a pneumatic tire in which a sound control material made of a sponge material is disposed in a tire inner cavity which is surrounded by a rim and the pneumatic tire, for reducing the road noise. However, there is the possibility that the sponge material mentioned above causes increase in the weight of a whole tire, resulting in a lowered fuel efficiency. Further, there is a problem that a cost increase is caused since a lot of sponge material is required.

Patent document 2 describes a pneumatic tire in which a partition wall comparting an air chamber in a circumferential direction is provided within the air chamber, which is formed between a tire inner peripheral surface and a rim outer peripheral surface, for the purpose of preventing increase in the road noise while suppressing a great cost increase. An equivalent length of an air column within the air chamber becomes short by comparting the air chamber in the circumferential direction by the partition wall, and it is possible to shift a resonant frequency of an air column resonance. As a result, it is possible to prevent the road noise from being increased by the air column resonance.

Further, patent document 3 describes a pneumatic tire in which an inner wall of the tire is provided with a thin elastic divider plate extending approximately in an axial direction within the tire inner cavity, for the purpose of reducing the load noise which is caused by the cavity resonance noise, while suppressing the increase of the weight. A sound pressure mode is changed in a whole of the tire inner cavity by the provision of the elastic divider plate within the tire inner cavity, and an in-vehicle sound level is reduced.

However, the partition wall and the divider plate oscillate themselves and may increase the road noise caused by the cavity resonance noise by serving a new sound source.

PRIOR ART DOCUMENT

Patent Document

Patent Document 1: JP-A-2006-306302
Patent Document 2: JP-A-7-117404
Patent Document 3: JP-A-5-294102

SUMMARY OF THE INVENTION

Accordingly, an object of the present invention is to provide a pneumatic tire which can reduce a cavity resonance noise while suppressing weight increase and cost increase, and a method of manufacturing the pneumatic tire.

The object can be achieved by the following present invention. That is, the present invention provides a pneumatic tire including a plate-like member in which a plurality of through holes and slits having both ends positioned within a plate surface are formed, and a supporting member which is inserted into the slits and supports plate-like portions in tooth sides of the slits in opposite directions to each other, wherein the plate-like member is attached to an inner surface of the tread portion by mounting portions which are respectively positioned closer to an outer side than both ends of the slits, so that a space is formed between the plate-like member and the inner surface of the tread portion.

In the pneumatic tire according to the present invention, the plate-like member having a plurality of through holes formed therein is attached to the inner surface of the tread portion. More specifically, the plate-like member is attached to the inner surface of the tread portion so that the space is formed between the plate-like member and the inner surface of the tread portion. As a result, a plurality of through holes are formed in the plate-like member which is in a state of floating from the inner surface of the tread portion. In general, when the sound passes through the through hole, there are generated the viscous damping caused by the friction between the air and the inner wall surface of the through hole, and the pressure loss damping caused by the vortex generated by the passing. Consequently, the sound is damped. Therefore, the sound within the tire passes through the through hole by attaching the plate-like member having the through holes formed therein to the inner surface of the tread portion, whereby it is possible to damp and reduce the cavity resonance noise. Further, since it is not necessary to provide a lot of noise absorbing material and sound control material such as sponge material, it is possible to suppress increase of the weight and increase of the cost. Further, in the present invention, since the supporting member inserted to the slits formed in the plate-like member supports the plate-like portions in both sides of the slits in the opposite directions to each other, it is possible to prevent a situation where the plate-like member is crushed against the inner surface of the tread portion due to the centrifugal force in association with the rotation of the tire and, thereby, the through holes are closed. As a result, it is possible to damp and reduce the cavity resonance noise not only at a low to middle speed, but also at a high speed.

In the pneumatic tire according to the present invention, the slits may be formed along a tire circumferential direction.

According to the structure, since the air flow in a tire circumferential direction generated within the tire easily passes through the through holes, it is possible to effectively reduce the cavity resonance noise.

In the pneumatic tire according to the present invention, the supporting member may be formed into a cylindrical shape, and a cylindrical axis direction thereof may be orthogonal to a length direction of the slits, and a length of each of the slits may be equal to or less than an outer diameter of the supporting member.

According to the structure, it is possible to prevent the supporting member from falling away from the slits during traveling. Further, since it is not necessary to fix the supporting member to the plate-like member by an adhesive agent, it is possible to suppress the increase of the weight.

In the pneumatic tire according to the present invention, both ends of the slits may reach the through holes in a circular shape.

According to the structure, it is possible to prevent the plate-like member from being ruptured due to the concentration of the stress into both ends of the slits.

In the pneumatic tire according to the present invention, the plate-like member may be attached to the inner surface of the tread portion over a whole periphery thereof, and a plurality of the slits may be formed so as to be uniformly spaced apart in a tire circumferential direction.

According to the structure, since the plate-like member is attached over a whole periphery of the inner surface of the tread portion, it is possible to effectively reduce the cavity resonance noise by the through holes. Further, it is possible to suppress deterioration of uniformity and a weight balance by arranging the supporting member in each of the slits which are formed at a uniform interval over the whole periphery in the tire circumferential direction.

Further the present invention provides a method of manufacturing a pneumatic tire, the method including a step of forming, to a plate-like member, a plurality of through holes and slits having both ends positioned within a plate surface, a step of inserting a supporting member into the slits, and a step of attaching the plate-like member to an inner surface of the tread portion by mounting portions which are respectively positioned closer to an outer side than both ends of the slits, so that a space is formed between the plate-like member and the inner surface of the tread portion.

In the pneumatic tire manufactured by the manufacturing method according to the present invention, the plate-like member having a plurality of through holes formed therein is attached to the inner surface of the tread portion. More specifically, the plate-like member is attached to the inner surface of the tread portion so that the space is formed between the plate-like member and the inner surface of the tread portion. As a result, a plurality of through holes are formed in the plate-like member which is in a floating state from the inner surface of the tread portion. In general, when the sound passes through the through hole, there are generated the viscous damping caused by the friction between the air and the inner wall surface of the through hole, and the pressure loss damping caused by the vortex generated by the passing. Consequently, the sound is damped. Therefore, the sound within the tire passes through the through hole by attaching the plate-like member having the through holes formed therein to the inner surface of the tread portion, whereby it is possible to damp and reduce the cavity resonance noise. Further, since it is not necessary to provide a lot of noise absorbing material and sound control material such as sponge material, it is possible to suppress increase of the weight and increase of the cost. Further, in the pneumatic tire manufactured by the manufacturing method according to the present invention, since the supporting member inserted to the slits formed in the plate-like member supports the plate-like portions in both sides of the slits in the opposite directions to each other, it is possible to prevent a situation where the plate-like member is crushed against the inner surface of the tread portion due to the centrifugal force in association with the rotation of the tire and, thereby, the through holes are closed. As a result, it is possible to damp and reduce the cavity resonance noise not only at a low to the middle speed, but also at a high speed.

DETAILED DESCRIPTION OF THE PREFERRED EMBODIMENTS

A description will be given below of embodiments according to the present invention with reference to the accompanying drawings.

First Embodiment

Figure 1:
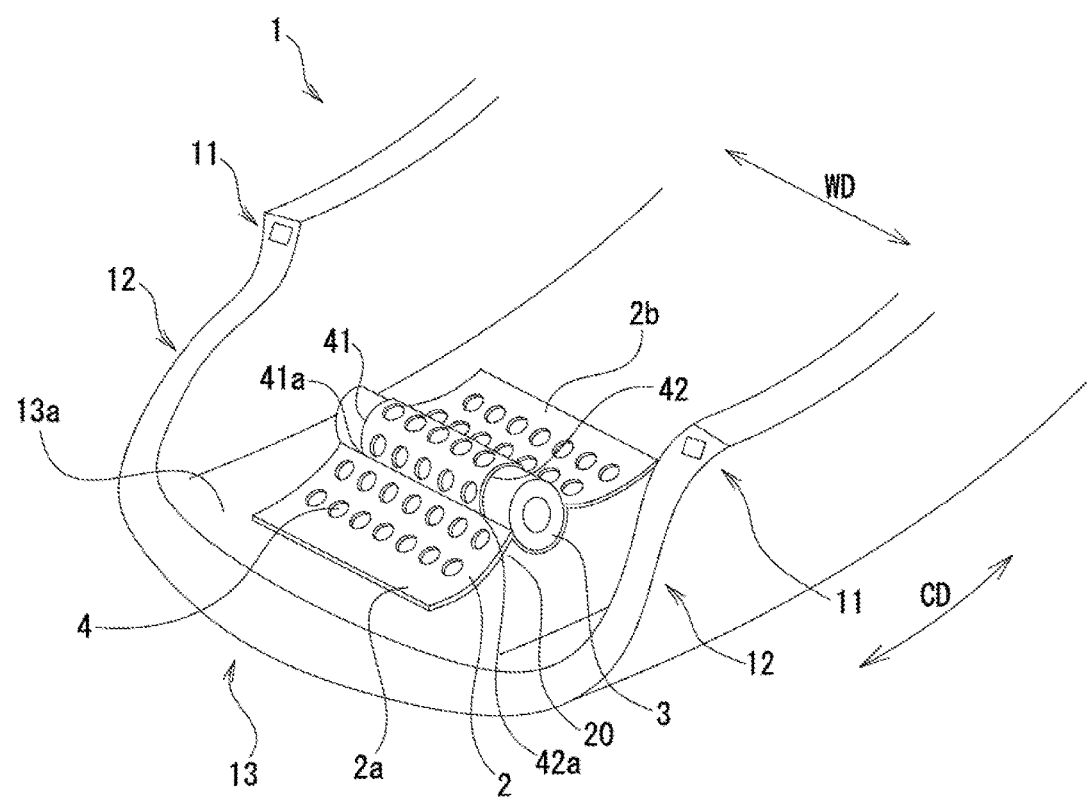
FIG. 1 is a perspective view showing an example of a pneumatic tire according to the present invention.
Figure 2A:
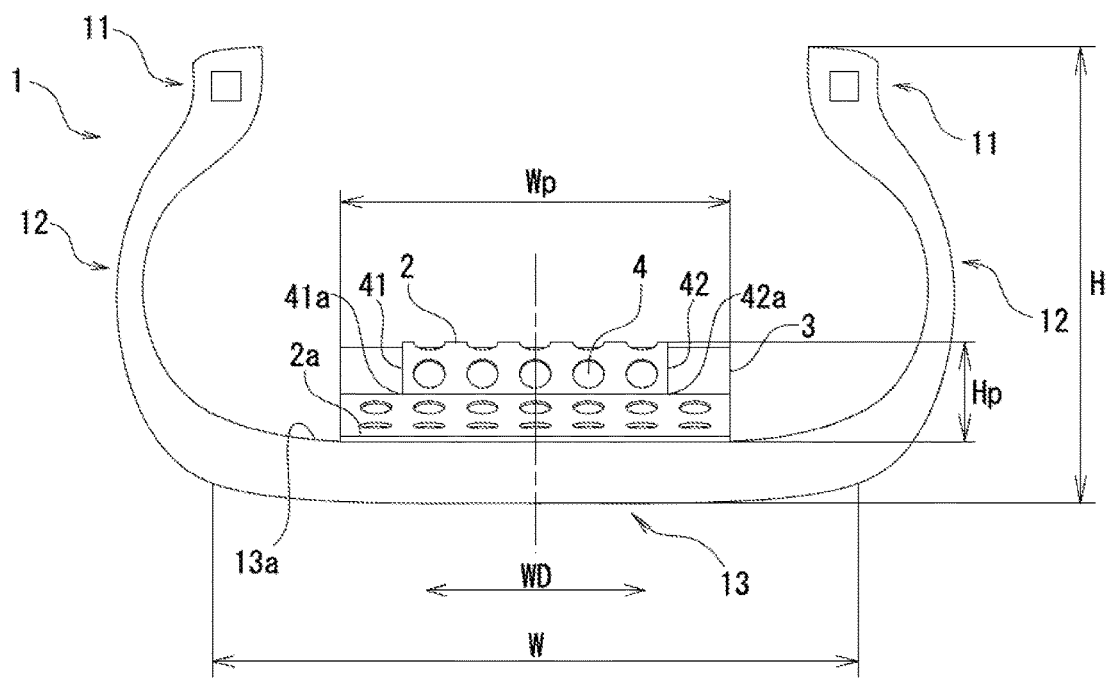
FIG. 2A is a tire meridian cross sectional view of the pneumatic tire.
Figure 2B:
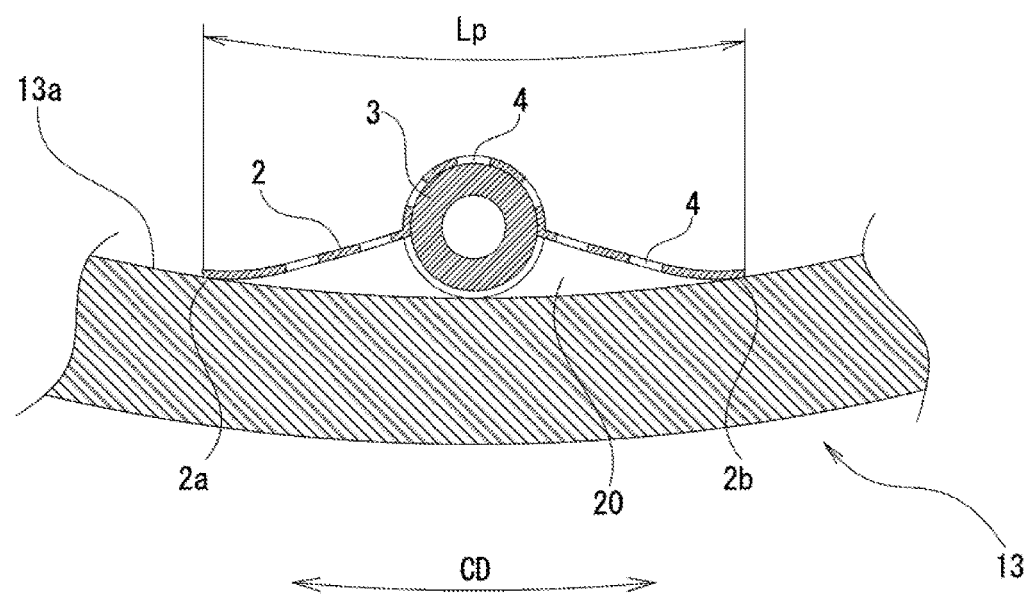
FIG. 2B is a cross sectional view in a tire circumferential direction of the pneumatic tire.

FIG. 1 is a perspective view showing an example of a pneumatic tire. FIG. 2A is an example of a tire meridian sectional view of the pneumatic tire. FIG. 2B is an example of a cross sectional view in a tire circumferential direction of the pneumatic tire. Here, reference symbol H denotes a tire cross sectional height. The tire cross sectional height H is a height from a nominal rim diameter to a tread surface, in a tire meridian cross section, in a state of being filled with air at a pneumatic pressure prescribed by JATMA.

A pneumatic tire 1 is provided with a pair of annular bead portions 11, side wall portions 12 which extend to outer sides in a tire diametrical direction from each of the bead portions 11, and a tread portion 13 which is connected to outer ends in the tire diametrical direction of each of the side wall portions 12, as shown in FIGS. 1 and 2A.

The pneumatic tire 1 is provided with a plate-like member 2 which is attached to an inner surface 13a of the tread portion. The plate-like member 2 is attached to the inner surface 13a of the tread portion by two mounting portions 2a and 2b which are arranged so as to be spaced apart in a tire circumferential direction CD.

Figure 2C:
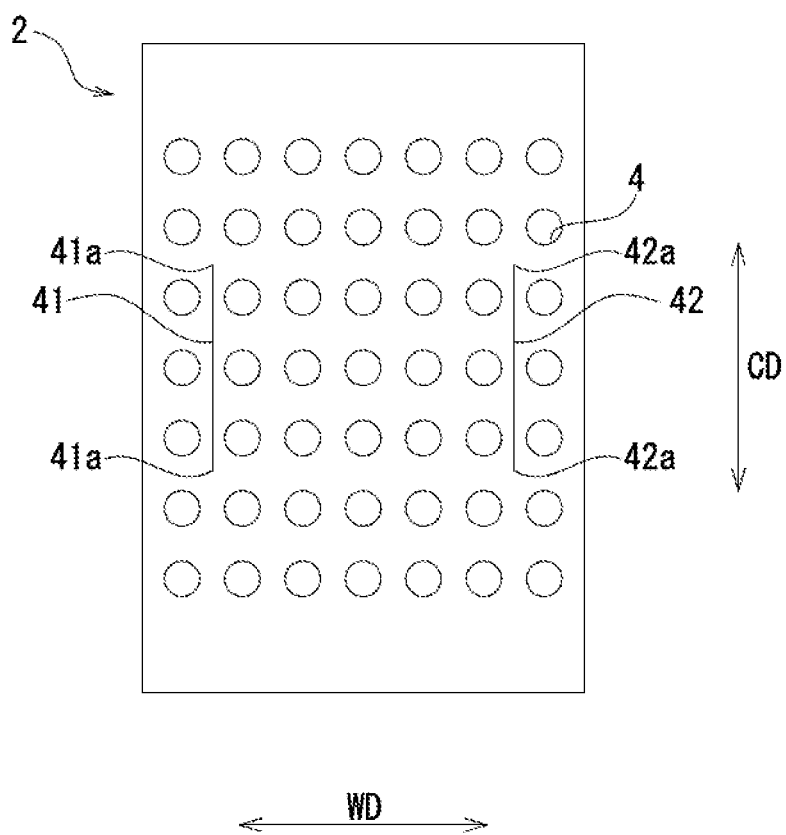
FIG. 2C is an expansion plan view in which a plate-like member is expanded on a plane.

FIG. 2C is an expansion plan view in which the plate-like member 2 is expanded on a plane. A plurality of through holes 4 and slits 41 and 42 having both ends positioned within a plate surface are formed in the plate-like member 2.

In the present embodiment, two slits 41 and 42 are formed. The slits 41 and 42 are formed along the tire circumferential direction CD. Both ends 41a, in an extending direction, of the slit 41 are positioned within the plate surface. Similarly, both ends 42a, in an extending direction, of the slit 42 are positioned within the plate surface.

A supporting member 3 is inserted into the slits 41 and 42. The supporting member 3 according to the present embodiment is formed into a cylindrical shape which extends along a tire width direction WD, and a cylindrical axial direction is orthogonal to a length direction of the slits 41 and 42, that is, the tire circumferential direction CD. Details of the supporting member 3 will be described later.

The supporting member 3 supports the plate-like portions in both sides of the slits 41 and 42 in the opposite directions to each other. Specifically, the supporting member 3 supports the plate-like portion, which is closer to an outer side in the tire width direction than the slits 41 and 42, in an external side in the tire diametrical direction. On the other hand, the supporting member 3 supports the plate-like portion, which is closer to the inner side in the tire width direction than the slits 41 and 42, in an internal side in the tire diametrical direction. As a result, the plate-like portion sandwiched by the slits 41 and the slit 42 in the plate-like member 2 is in a state of floating from the inner surface 13a of the tread portion.

Further, the plate-like member 2 is attached to the inner surface 13a of the tread portion by the mounting portions 2a and 2b in such a manner that a space 20 is formed between the plate-like member 2 and the inner surface 13a of the tread portion. In other words, a part of the plate-like member 2 is in non-contact with the inner surface 13a of the tread portion. The mounting portions 2a and 2b are respectively positioned outer sides of both ends 41a and 42a of the slits 41 and 42.

In the present embodiment, both end portions in the tire width direction WD of the plate-like member 2 positioned in the outer side in the tire diametrical direction of the supporting member 3 are in contact with the inner surface 13a of the tread portion, however, are not fixed to the inner surface 13a of the tread portion. The space 20 is an area which is between two mounting portions 2a and 2b and is surrounded by the outer surface of the plate-like member 2 and the inner surface 13a of the tread portion.

A plurality of through holes 4 are formed in the plate-like member 2. The through holes 4 are formed in a whole surface of the plate-like member 2. There exist the through holes 4 which are formed toward the space 20 without being in contact with the supporting member 3, in addition to the through holes 4 which are in contact with the supporting member 3.

Here, a description will be given of an effect of damping a cavity resonance noise by the through holes 4. When the sound passes through the through holes 4, the cavity resonance noise is damped by friction between air serving as a medium and an inner wall surface of the through hole 4 (viscous damping). Further, when the sound passes through the through hole 4, the cavity resonance noise is damped by a pressure loss caused by a vortex which is generated by the passing (pressure loss damping). As a result, since the sound within the tire passes through the through holes 4 by attaching the plate-like member 2 having the through holes 4 formed therein to the inner surface 13a of the tread portion, it is possible to damp and reduce the cavity resonance noise.

Further, a particle speed of the air is involved with the viscous damping and the pressure loss damping when the sound passes through the through holes 4. In the case that the through holes 4 are arranged at the positions having a greater particle speed, the cavity resonance noise can be effectively damped. Further, since an air flow is added to the speed, the through holes 4 are preferably arranged in the place having the air flow, in the rotating tire.

Figure 3:
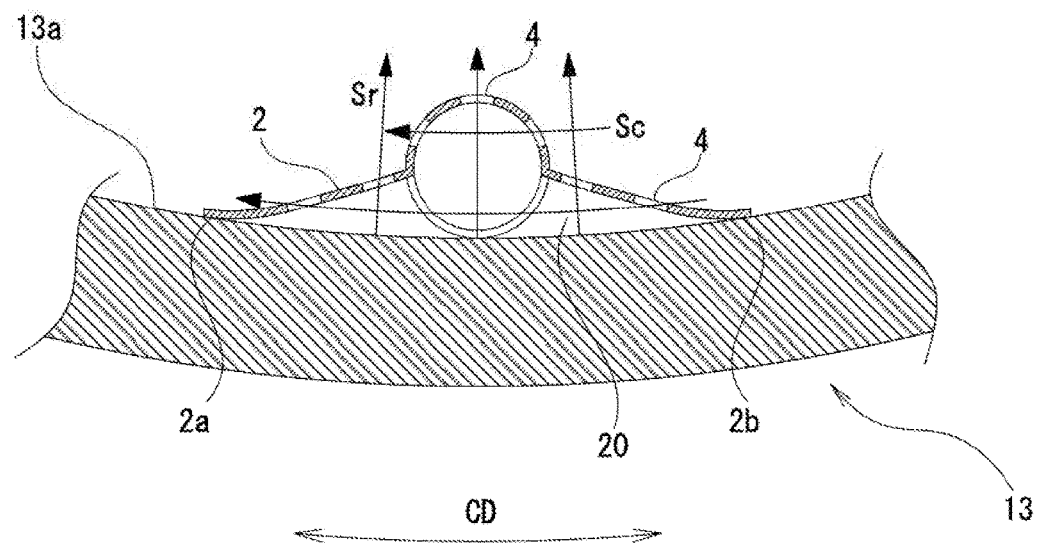
FIG. 3 is an enlarged cross sectional view showing the plate-like member in an enlarged manner.

FIG. 3 is an enlarged cross sectional view showing the plate-like member 2 having the through holes 4 formed therein in an enlarged manner (in this case, the supporting member 3 is not shown). The air flow within the tire is shown by arrows. Within the tire, there exist an air flow Sr in the tire diametrical direction which is generated by deformation of the tire caused by the ground on the road surface, and an air flow Sc in the circumferential direction CD which is generated by restoration of the deformation. Since the sound generated by the input from the road surface and the air flow Sr in the tire diametrical direction pass through the through holes 4 by arranging the plate-like member 2 so as to cover the inner surface 13a of the tread portion, it is possible to effectively reduce the cavity resonance noise. Further, since the sound transmitted in the tire circumferential direction CD and the air flow Sc in the tire circumferential direction CD pass through the through holes 4 by attaching the plate-like member 2 to the inner surface 13a of the tread portion so that the space 20 is formed between the plate-like member 2 and the inner surface 13a of the tread portion, it is possible to effectively reduce the cavity resonance noise.

Further, the closer to the inner surface 13a of the tread portion the air flow is, the faster the air flow is. Considering the fact, in the present invention, the plate-like member 2 having the through holes 4 therein is attached to the inner surface 13a of the tread portion.

The supporting member 3 is inserted into the slits 41 and 42 which are formed in the plate-like member 2. The plate-like member 2 is preferably formed with a small thickness for suppressing the increase of the weight. However, in the case that the thickness is small, the plate-like member 2 is crushed against the inner surface 13a of the tread portion due to centrifugal force and, thereby, the through holes 4 are closed when the tire is rotated at a high speed. As a result, there is a risk that the effect of reducing the cavity resonance noise by the through holes 4 can not be obtained or is lowered. On the contrary, the deformation of the plats-like member 2 can be suppressed by making the plate-like member 2 thick or hard. However, as the weight is increased or the performance of following the deformation of the tire is obstructed, there is a risk that the other performances and the durability are adversely affected. According to the present invention, since the plate-like member 2 can be prevented from being crushed, by inserting the supporting member 3 to the slits 41 and 42 and supporting the plate-like portions in both sides of the slits 41 and 42 in the opposite directions to each other, it is possible to reduce the cavity resonance noise not only at a low to the middle speed, but also at a high speed.

The supporting member 3 is preferably formed by a porous material. Accordingly, it is possible to obtain a sound absorbing effect of the supporting member 3 itself while suppressing the increase of the weight by the supporting member 3. Here, the porous material is constructed, for example, by a sponge and an unwoven fabric. The porous material is not limited to them, however, a sponge made of a soft polyurethane foam is preferably employed. Further, in the case that the unwoven fabric is employed as the porous material, the supporting member 3 is formed by making the unwoven fabric into a ball or folding the fabric.

The supporting member 3 according to the present embodiment is formed into a tubular shape which extends along the tire width direction WD. In the case that the supporting member 3 is formed into the tubular shape, an air layer is formed in an inner portion. As a result, the effect of absorbing the sound passing through the supporting member 3 made of the porous material is enhanced. However, the shape of the supporting member 3 is not particularly limited as long as the shape is the one which can support the plate-like member 2 against the centrifugal force, and a solid columnar shape may be employed. Further, the supporting member 3 does not necessarily support a whole, in the tire width direction, of the plate-like member 2, but may be formed into a shape which can support at least a part of the plate-like member 2. Further, the supporting member 3 may be formed into a shape which extends along the tire width direction WD beyond the width, in the tire width direction WD, of the plate-like member 2.

Further, a cylindrical shape is particularly preferable for the shape of the supporting member 3. In the case that the supporting member 3 is formed into the cylindrical shape, the sound absorbing effect can be achieved in relation to the sound from any angles. However, the cross-sectional shape of the supporting member 3 may be formed into polygonal shapes such as a triangular shape and a quadrangular shape, in addition to the circular shape.

The supporting member 3 is preferably locked to the slits 41 and 42. In the case that the supporting member 3 is formed by the porous material as described above, the supporting member 3 may be inserted into the slits 41 and 42 in a compressed state. For example, in the case that the lengths of the slits 41 and 41 are made equal to or less than an outer diameter of the cylindrical supporting member 3, the maximum circumferential length formed by the slits 41 and 42 is smaller than an outer peripheral length of the supporting member 3. As a result, the supporting member 3 is hard to come off from the slits 41 and 42.

A thickness of the plate-like member 2 is preferably between 0.1 and 10 mm, and more preferably between 0.2 and 2 mm. In the case that the thickness of the plate-like member 2 is made smaller than 0.1 mm, the effect of reducing the cavity resonance noise by the plate-like member 2 becomes small. On the contrary, in the case that the thickness of the plate-like member 2 is made larger than 10 mm, the inner surface 13a of the tread portion is locally added with weight by the plate-like member 2. As a result, there is a tendency that the high-speed uniformity is deteriorated, and a vibration and ride quality caused thereby are deteriorated.

The maximum height Hp of the plate-like member 2 from the inner surface 13a of the tread portion in a tire equator is preferably equal to or more than one tenths of the tire cross sectional height H (or 10 mm). In the case that the maximum height Hp of the plate-like member 2 is made lower than one tenths of the tire cross sectional height H (or 10 mm), the effect of reducing the cavity resonance noise by the plate-like member 2 becomes small. On the contrary, the maximum height Hp of the plate-like member 2 is preferably equal to or less than one half of the tire cross sectional height H. In the case that the maximum height Hp of the plate-like member 2 is made higher than one half of the tire cross sectional height H, there is a risk that the plate-like member 2 comes into contact with the rim flange at a time of assembling in the rim and a malfunction may be caused.

A width Wp in the tire width direction of the plate-like member 2 is preferably between 30 and 120% of a ground width W. In the case that the width Wp of the plate-like member 2 is made smaller than 30% of the ground with W, the effect of reducing the cavity resonance noise becomes small. On the contrary, in the case that the width Wp of the plate-like member 2 is made larger than 120% of the ground width W, there is a risk that the plate-like member 2 comes into contact with the inner surface of the side wall due to the deformation at the grounding time and the following performance to the curved surface is deteriorated. Therefore, the malfunction may be caused.

Although a length Lp in the tire circumferential direction of the plate-like member 2 is preferably equal to or less than the ground length, and is preferably about one half thereof, it is not limited thereto depending on the mounting number and the tire size. The length Lp in the tire circumferential direction of the plate-like member 2 is preferably in a site that partially overlaps with the ground length for covering the ground portion in stepping in and kicking out.

Figure 4:
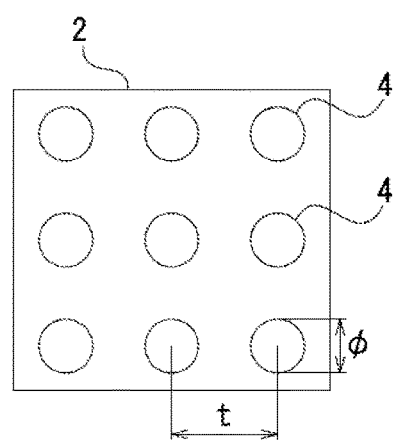
FIG. 4 is a plan view of the plate-like member.

FIG. 4 is a plan view showing a state in which a part of the plate-like member 2 is expanded into a plane shape. A hole diameter $\phi$ of the through hole 4 is preferably between 0.4 and 10 mm, and is more preferably between 1 and 5 mm. In the case that the hole diameter $\phi$ is smaller than 0.4 mm, the resistance when the sound and the air pass through becomes too large. As a result, it is hard to produce the through hole as well as the through hole is not effective. On the contrary, in the case that the hole diameter $\phi$ is larger than 10 mm, the resistance when the sound and the air pass through becomes too small. As a result, the damping effect becomes small.

Further, a hole area rate P is preferably between 1 and 20%, and more preferably between 1 and 10%. In the case that the hole area rate P is smaller than 1%, the resistance when the sound and the airpass through becomes too large. As a result, the hole is not effective. On the contrary, in the case that the hole area rate P is larger than 20%, the resistance when the sound and the air pass through becomes too small. As a result, the damping effect becomes small. When a hole distance between the through holes 4 is represented by t, the hole area rate P in the case that a plurality of through holes 4 are arranged in parallel vertically and laterally as in the present embodiment is defined by an expression $P=(\pi \times \phi^2)/(4 \times t^2)$. For example, when the hole diameter $\phi$ is 3 mm and the hole distance t is 10 mm, the hole area rate P is about 7%.

The hole distance t between the through holes 4 can be appropriately set by the hole area rate P and the hole diameter $\phi$ while using the expression described above; however, the hole distance t is preferably between 1 and 30 mm and is more preferably between 5 and 15 mm, for example. In the case that the hole distance t is smaller than 1 mm, the number of the holes is necessarily increased. As a result, the resistance when the sound and the air pass through becomes too small, the damping effect becomes small, and a strength of the plate itself is further deteriorated. On the contrary, in the case that the hole distance t is larger than 30 mm, the number of the holes is necessarily reduced, and the obtained damping effect becomes small.

The plate-like member 2 is formed by a plate-like or film-like resin. As the resin, general-purpose resins such as PET, PU, TPU, PVC, PC and PEN can be exemplified.

Figure 5:
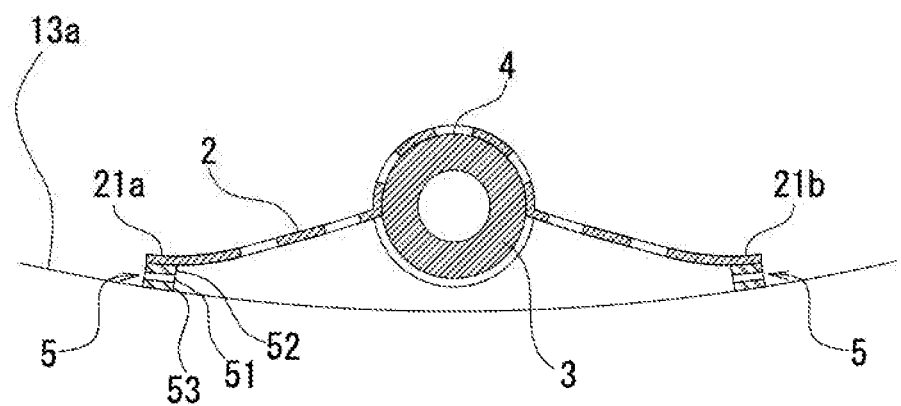
FIG. 5 is a cross sectional view in a tire circumferential direction of a pneumatic tire according to an other embodiment.

The plate-like member 2 is attached to the inner surface 13a of the tread portion by the mounting portions 2a and 2b. The plate-like member 2 is fixed to the inner surface 13a of the tread portion by an adhesive agent or a double-stick tape. At this time, the plate-like member 2 is preferably fixed to the inner surface 13a of the tread portion via a cushion layer 5, as shown in FIG. 5. The cushion layer 5 includes a cushion layer main body 51 having a stretching property, and double-stick tapes 52 and 53 in both sides of the cushion layer main body 51. Accordingly, the cushion layer main body 51 in the cushion layer 5 is deformed, and can follow the shape of the curved surface of the inner surface 13a of the tread portion and the deformation at the grounding time. As a result, it is possible to stably fix the plate-like member 2 to the inner surface 13a of the tread portion.

The weight of the plate-like member 2 is preferably equal to or less than 15 g, and more preferably equal to or less than 10 g. The weight of the plate-like member 2 locally increases the weight of the inner surface 13a of the tread portion, and tends to deteriorate high-speed uniformity and deteriorate the vibration caused thereby and the ride quality. In the case that the cushion layer 5 described above is provided, a total weight including the plate-like member 2, the supporting member 3 and the cushion layer 5 is preferably set to be equal to or less than 20 g, and more preferably set to be equal to or less than 15 g.

Second Embodiment

Figure 6:
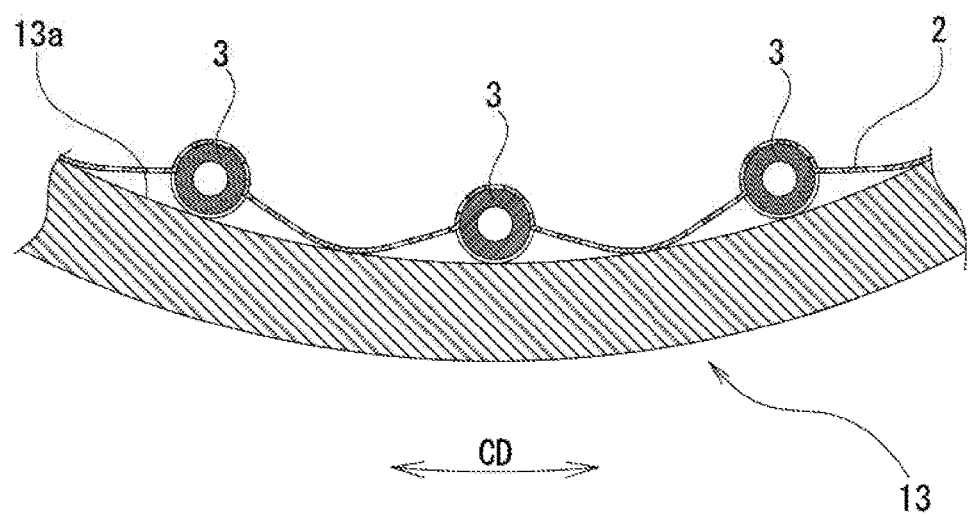
FIG. 6 is a cross sectional view in the tire circumferential direction of the pneumatic tire according to the other embodiment.

In the first embodiment described above, there is shown the example provided with the plate-like member 2 in which a plurality of through holes 4 and the slits 41 and 42 including both ends 41a and 42a positioned within the plate are formed, and one supporting member 3 which is inserted into the slits 41 and 42, and supports the plate-like portions in both sides of the slits 41 and 42 in the opposite directions to each other. However, as shown in FIG. 6, a long plate-like member 2 may be attached over a whole periphery of the inner surface 13a of the tread portion, a plurality of slits 41 and 42 may be formed at uniform intervals in the tire circumferential direction CD, and supporting members 3 may be inserted respectively into the slits 41 and 42.

Method of Manufacturing Pneumatic Tire

Next, a description will be given of a method of manufacturing the pneumatic tire. The method of manufacturing the pneumatic tire according to the present invention includes a step of forming a plurality of through holes 4, and the slits 41 and 42 having both ends 41a and 42a positioned within the plate, in relation to the plate-like member 2, a step of inserting the supporting member 3 into the slits 41 and 42, and a step of attaching the plate-like member 2 to the inner surface 13a of the tread portion by the mounting portions 2a and 2b which are respectively positioned closer to the outer side than both ends 41a and 42a of the slits 41 and 42, so that the space 20 is formed between the plate-like member 2 and the inner surface 13a of the tread portion.

Other Embodiment (1) In the embodiments described above, two slits 41 and 42 are formed. However, the number of the slits is not limited to two, and may be set to one or three or more. In the case that a plurality of slits is formed, the distance between the slits can be appropriately set.

Figure 7:
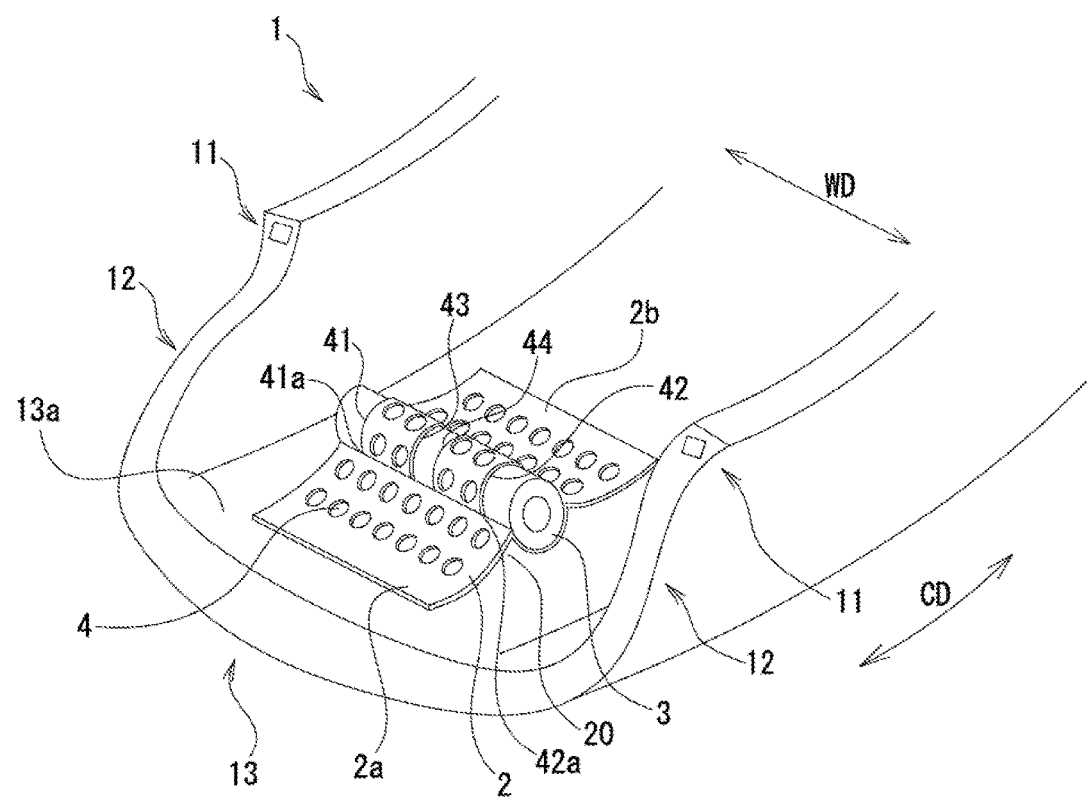
FIG. 7 is a perspective view showing the pneumatic fire according to the other embodiment.

FIG. 7 shows an example in which four slits 41, 42, 43 and 44 are formed. In this example, the supporting member 3 supports the plate-like portion which is closer to the outer side in the tire width direction than the slit 41, the plate-like portion which is sandwiched between the slit 43 and the slit 44, and the plate-like portion which is closer to the outer side in the tire width direction than the slit 42, in an external side in the tire diametrical direction, and supports the plate-like portion which is sandwiched between the slit 41 and the slit 43, and the plate-like portion which is sandwiched between the slit 42 and the slit 44, in an internal side in the tire diametrical direction. However, the supporting member 3 may support the plate-like portion which is closer to the outer side in the tire width direction than the slit 41, the plate-like portion which is sandwiched between the slit 43 and the slit 44, and the plate-like portion which is closer to the outer side in the tire width direction than the slit 42, in the internal side in the tire diametrical direction, and may support the plate-like portion which is sandwiched between the slit 41 and the slit 43, and the plate-like portion which is sandwiched between the slit 42 and the slit 44, in the external side in the tire diametrical direction. In this case, the number of the through holes 4 formed in the plate-like portion supported to the internal side in the tire diametrical direction is preferably more than the number of the through holes 4 formed in the plate-like portion supported to the external side in the tire diametrical direction.

Figure 8:
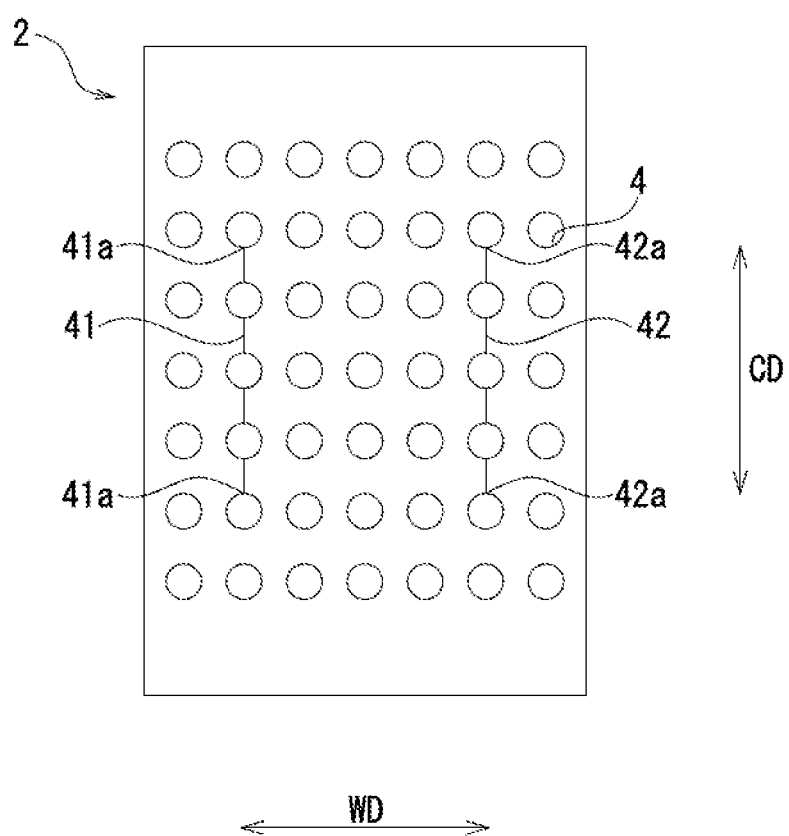
FIG. 8 is an expansion plan view of a plate-like member according to the other embodiment.

(2) In the example shown in FIG. 2C, the slits 41 and 42 and the through holes 4 are respectively arranged independently, however, they are not limited to this. For example, as shown in FIG. 8, the slits 41 and 42 may be arranged so as to cut across a plurality of through holes 4. Further, in this example, both ends 41a and 42a of the slits 41 and 42 reach the circular through holes 4, and it is possible to avoid stress concentration on both the ends 41a and 42a.

(3) The slits are not necessarily formed along the tire circumferential direction CD. For example, the slits may be formed along the tire width direction WD. At this time, the axial direction of the supporting member 3 is arranged along the tire circumferential direction CD.

(4) In the example shown in FIG. 2B, the outer surface of the plate-like member 2 positioned in the outer side in the tire diametrical direction of the supporting member 3 is in contact with the inner surface 13a of the tread portion, however, it is preferable that it is not in contact with the inner surface 13a of the tread portion (refer to FIG. 5).

(5) The shape of the supporting member 3 is not limited to the shape described above. For example, the shape may be a solid circular cylinder shape or a solid square post shape.

Figure 9:
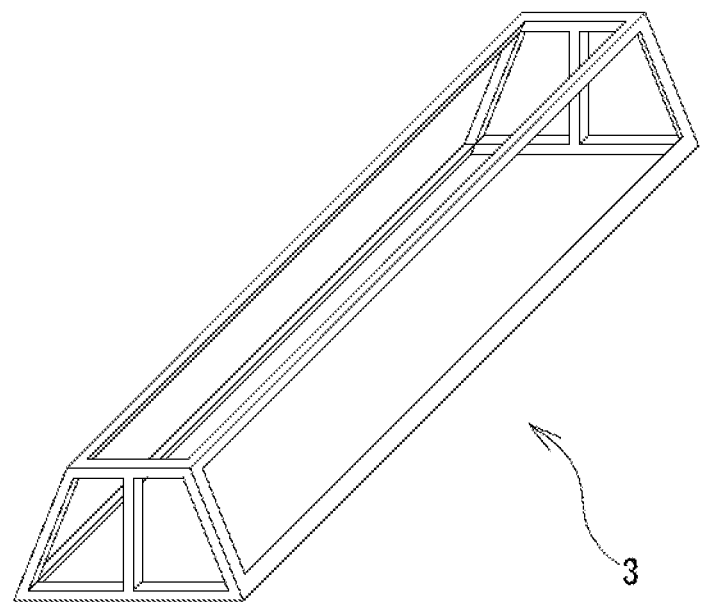
FIG. 9 is a perspective view of a supporting member according to the other embodiment.

(6) Further, the supporting member 3 is not necessarily formed by the porous material. For example, the supporting member 3 may be formed by the resin frame as shown in FIG. 9. As the resin, there can be exemplified the general-purpose resins such as PET, PU, TPU, PVC, PC, PE and PEN. The shape of the frame is not limited to the trapezoidal cross section as shown in FIG. 9, but may be a triangular cross section or a rectangular cross section.

What is claimed is:
1. A pneumatic tire comprising:
a plate-like member in which a plurality of through holes and slits having both ends positioned within a plate surface are formed; and
a supporting member which is inserted into the slits and supports plate-like portions in both sides of the slits in opposite directions to each other,
wherein the plate-like member is attached to an inner surface of a tread portion by mounting portions which are respectively positioned closer to an outer side than both ends of the slits, so that a space is formed between the plate-like member and the inner surface of the tread portion.
2. The pneumatic tire according to claim 1, wherein the slits are formed along a tire circumferential direction.
3. The pneumatic tire according to claim 1, wherein
the supporting member is formed into a cylindrical shape, and a cylindrical axis direction thereof is orthogonal to a length direction of the slits, and
a length of each of the slits is equal to or less than an outer diameter of the supporting member.
4. The pneumatic tire according to claim 1, wherein both ends of the slits reach the circular through holes.
5. The pneumatic tire according to claim 1, wherein the plate-like member is attached to the inner surface of the tread portion over a whole periphery thereof, and a plurality of the slits are formed so as to be uniformly spaced apart in a tire circumferential direction.
6. A method of manufacturing a pneumatic tire, the method comprising:

a step of forming, to a plate-like member, a plurality of through holes and slits having both ends positioned within a plate surface;

a step of inserting a supporting member into the slits; and a step of attaching the plate-like member to an inner surface of a tread portion by mounting portions which are respectively positioned closer to an outer side than both ends of the slits, so that a space is formed between the plate-like member and the inner surface of the tread portion.

* * * * *